United States Patent [19]
Kakizaki

[11] 4,113,223
[45] Sep. 12, 1978

[54] CROSS-MOVABLE CARRIAGE

[75] Inventor: Yukio Kakizaki, Kawasaki, Japan

[73] Assignee: Nippon Kogaku K. K., Tokyo, Japan

[21] Appl. No.: 768,608

[22] Filed: Feb. 14, 1977

[30] Foreign Application Priority Data

Feb. 27, 1976 [JP] Japan .................................. 51-20153

[51] Int. Cl.² ........................................... F16M 13/00
[52] U.S. Cl. .................................... 248/430; 108/143; 248/184
[58] Field of Search ....................... 33/180 R; 108/143; 248/23, 476, 424, 429, 430, 176, 184; 350/86, 90; 308/3 R, 3 A, 3 CH

[56] References Cited

U.S. PATENT DOCUMENTS

| | | | |
|---|---|---|---|
| 1,285,628 | 11/1918 | Craley | 308/3 R |
| 2,380,209 | 7/1945 | Bachman et al. | 308/3 R |
| 2,630,353 | 3/1953 | Rutz | 308/3 A |
| 3,204,584 | 9/1965 | Mladjan | 108/143 |
| 3,233,949 | 2/1966 | Rieman et al. | 308/3 A |
| 3,244,393 | 4/1966 | Wallerstein | 248/430 X |
| 3,377,111 | 4/1968 | Brault | 308/3 R |
| 3,600,811 | 8/1971 | Weyrauch | 350/86 |
| 3,628,761 | 12/1971 | Thomas | 248/184 |
| 3,971,599 | 7/1976 | Shio | 308/3 A |

FOREIGN PATENT DOCUMENTS

| | | | |
|---|---|---|---|
| 1,047,473 | 12/1958 | Fed. Rep. of Germany | 350/86 |
| 1,120,176 | 12/1961 | Fed. Rep. of Germany | 350/86 |
| 685,573 | 12/1939 | Fed. Rep. of Germany | 350/86 |
| 1,938,771 | 1/1972 | Fed. Rep. of Germany | 248/176 |

*Primary Examiner*—Lawrence J. Staab
*Attorney, Agent, or Firm*—Shapiro and Shapiro

[57] ABSTRACT

In a cross-movable carriage comprising a movable base plate and a stationary base plate, the movable base plate has two first guide grooves formed in one surface thereof and the stationary base plate has two second guide grooves formed in one surface thereof. A guide mechanism comprises two first guide members capable of fitting in the first guide grooves and two second guide members capable of fitting in the second guide grooves. One of the second guide members and one of the first guide members are fastened together, and the other of the second guide members and the other of the first guide members are fastened together. The guide mechanism is provided between the movable base plate and the stationary base plate to permit the first guide members to fit in the first guide grooves and permit the second guide members to fit in the second guide grooves.

4 Claims, 1 Drawing Figure

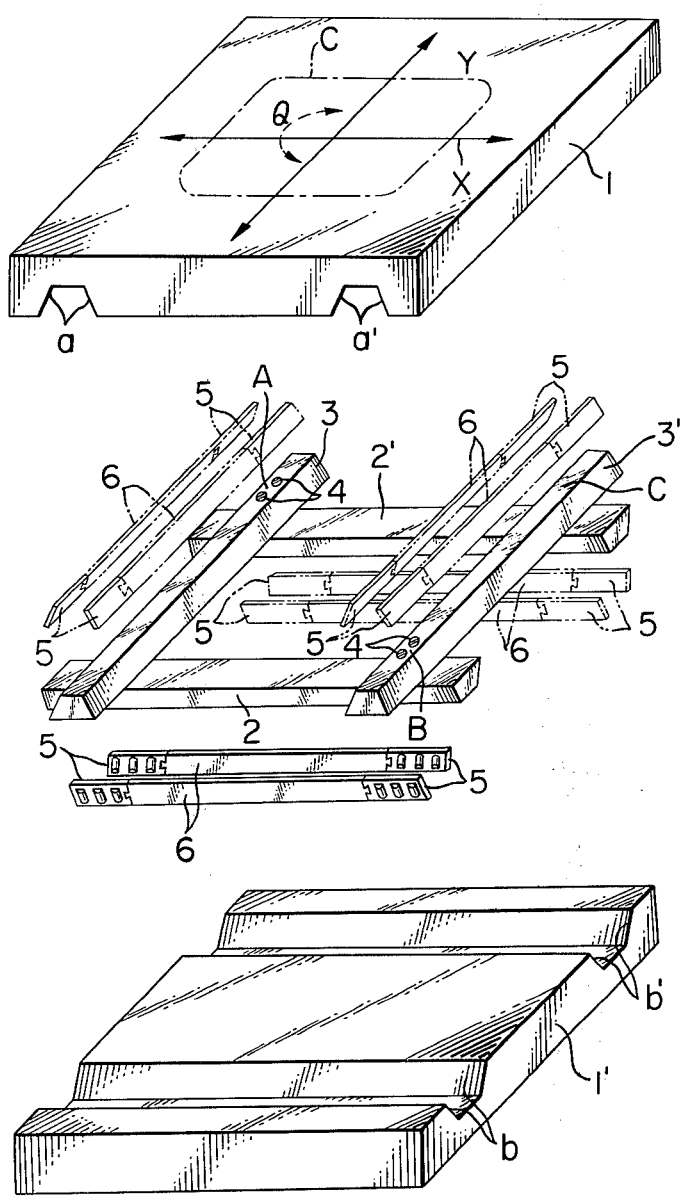

CROSS-MOVABLE CARRIAGE

BACKGROUND OF THE INVENTION

1. Field of the Invention

This invention relates to a cross-movable carriage of the double-V mechanism type which is simple in construction.

2. Description of the Prior Art

A cross-movable carriage having a great stroke and directed to supporting thereon a light-weight sample such as I.C. pattern or the like, is similar, in construction, to the conventional cross-movable carriage of the compound type or the cross-movable carriage for microscope. Such crossmovable carriage for a light weight sample suffers from disadvantages that the apparatus to be equipped with such carriage becomes bulky because of the necessity for various parts of the apparatus to be sturdy enough to withstand the weight of the carriage itself, in spite of the light weight of the sample to be supported on the carriage, and that the number of those parts can not be reduced.

Also, the conventional carriage of the double-V mechanism type can not well operate unless the guide grooves formed in the base plate are high in degree of straightness and very high in degree of parallelism, and offers a great disadvantage that the manufacture of such carriage involve much trouble and technical difficulties.

SUMMARY OF THE INVENTION

It is a first object of the present invention to provide a cross-movable carriage which is simple to construct and high in accuracy.

It is a second object of the present invention to provide a cross-movable carriage of the double-V mechanism type which is easy to manufacture.

According to the present invention, the cross-movable carriage may comprise a movable base plate having two first guide grooves formed in one surface thereof, a stationary base plate having two second guide grooves formed in one surface thereof, and a guide mechanism consisting of two first guide members capable of fitting in the first guide grooves, and two second guide members capable of fitting in the second guide grooves. One of the second guide grooves and one of the first guide members are fastened together, and the other of the second guide members and the other of the first guide members are fastened together. The guide mechanism may be provided between the movable base plate and the stationary base plate to permit the first guide members to fit in the first guide grooves and permit the second guide members to fit in the second guide grooves.

Said one of the first guide members and said one of the second guide members may be fastened together so as to make right angles therebetween.

The first guide grooves are parallel to each other, and the second guide grooves are parallel to each other. The other of the second guide member and the other of the first guide member may be fastened together so as to make right angles therebetween.

The invention will become more fully apparent from the following detailed description of some embodiments thereof taken in conjunction with the accompanying drawing.

BRIEF DESCRIPTION OF THE DRAWING

The FIGURE of the drawing is an exploded view of an embodiment of the cross-movable carriage according to the present invention.

DESCRIPTION OF THE PREFERRED EMBODIMENTS

A first embodiment of the present invention will hereinafter be described by reference to the drawing which is an exploded view of an embodiment of the cross-movable carriage according to the present invention. The base of the cross-movable carriage generally comprises a movable base plate 1 disposed at the top and movable in a cross-like manner and a stationary base plate 1' disposed at the bottom and securely fixed to a body (not shown) supporting the crossmovable carriage.

On the upper surface of the movable base plate 1, there are defined two axes orthogonal to each other as indicated by arrows X and Y in the drawing.

In the lower surface of the movable base plate 1, there are formed first guide grooves $a$ and $a'$ of trapenoidal cross-section and exact straightness extending in the direction of arrow Y, as shown. In the upper surface of the stationary base plate 1', there are formed second guide grooves $b$ and $b'$ of inverted trapezoidal cross-section and exact straightness extending in the direction of arrow X, as shown.

Disposed between in movable base plate 1 and the stationary base plate 1' are two first guide members 3 and 3' of trapezoidal cross-section for fitting into the first guide grooves $a$ and $a'$, respectively, and two second guide members 2 and 2' of inverted trapezoidal cross-section for fitting into the second guide grooves $b$ and $b'$, respectively. As shown, the first and the second guide members are arranged in the form of parallel crosses with the bottom sides of the trapezoids of the first guide members 3, 3' being in intimate contact with the bottom sides of the inverted trapezoids of the second guide members 2, 2'.

Between the movable base plate 1 and the first guide members 3, 3' and between the stationary base plate 1' and the second guide members 2, 2', there are disposed needle bearings 5 and separators 6, eight in all, so that they bear simultaneously against the respective sloped surfaces of the guide members 3, 3', 2, 2'. The needle bearings 5 and the separators 6 serve to provide smooth relative sliding between the guide grooves $a$, $a'$, $b$, $b'$ and the guide members 3, 3', 2, 2', respectively. If not necessary, the needle bearings 5 and separators 6 need not be provided.

Description will now be made of the manner in which the carriage is assembled.

First, the second guide members 2, 2' are fitted into the second guide grooves $b$, $b'$, respectively. Subsequently, as already mentioned, only one of the first guide members, 3, is placed with the bottom side of the trapezoid thereof being in intimate contact with the second guide members 2, 2', and then the degree of orthogonality between one of the second guide members, 2', and said one first guide member 3 is measured by known means such as a right-angled ruler or the like so that these members form exactly right angles. Then, by the use of two screws 4, said one first guide member 3 and said one second guide member 2' are fastened together at the intersection A therebetween so as to form an L-shape, as shown.

Next, the other first guide member 3' is placed with the bottom side of the trapezoid thereof in contact with the second guide members 2, 2', whereafter one of the first guide grooves, $a$, and said one first guide member 3 are fitted together while, at the same time, the other first guide member 3' is positioned so that it is fitted in the other first guide groove $a'$. Then, among the intersections between the other first guide member 3' and the other second guide member 2, the intersection B which is in diagonal relationship with the intersection previously fastened by the two secrews 4 is also fastened by two screws 4, as shown.

In the embodiment shown, two screws each are used but the number of such screws may be optional.

In the manner described above, the first guide members 3, 3' and the second guide members 2, 2' are assembled in the form of parallel crosses.

The relationship between the aforementioned arrows X and Y orthogonal to each other is such that the arrow X indicates the direction of translation of one second guide member 2' and the arrow Y indicates the direction of translation of one first guide member 3.

Operation of the carriage will now be explained.

When the movable base plate 1 in the direction of arrow X is moved, the first guide members 3, 3' will come to fit respectively in the first guide grooves $a$, $a'$ of the movable base plate 1 and, since said one first guide member 3 and said one guide member 2' are fastened together at the intersection A and said other first guide member 3' and the other second guide member 2 are fastened together at the intersection B, the first guide members 3, 3' and the second guide members 2, 2' will be moved together with the movable base plate 1.

In this case, even if the second guide grooves $b$ and $b$ are high in degree of straightness but low in degree of parallelism, but if said one first guide member 3 is secured to said one first guide groove $a$ by screws or like means, the movable base plate 1, said one first guide member 3 and said one second guide member 2' will become in one united body so that said one second guide member 2' will be translated following said one second guide grooves $b'$, thus moving the base plate 1 in the direction of arrow X. Also, the other second guide member 2 will be translated following the other guide groove $b$ and the other first guide member 3' at its unfastened free end portion C will be translated in the direction of arrow Y. Thus, even if the degree of parallelism between the first guide grooves B and B' is not high, the other second guide member 2 can advance escaping in the other second guide groove $b$, so that the movable base plate 1 can move in the direction of arrow X.

When the movable base plate 1 is moved in the direction of arrow Y, the second guide members 2, 2' will come to fit respectively in the second guide grooves $b$, $b'$ of the stationary base plate 1' and, since said one second guide member 2' and said one first guide member 3 are fastened together at the intersection A, said one second guide member 2' and said first guide member 3 are fixed to the stationary base plate 1' against the movement in the direction of arrow Y, and since the other second guide member 2 and the other first guide member 3' are fastened together at the intersection B and the other second guide member 2 is fitted in the other guide groove $b$, the movable base plate 1 alone will be translated following said one first guide member 3, unlike the aforementioned case of the movement in the direction of arrow X.

In this case, even if the first guide grooves $a$ and $a'$ are high in degree of straightness but low in degree of parallelism, but if said one second guide member 2' is secured to said one second guide groove $b'$ as by screws so as to prevent movement of said one second guide member 2' and said first guide member 3 on the stationary plate 1', the movable base plate 1 will move in the direction of arrow Y following said one first guide member 3 which is truly at right angles with said one second guide member 2' while the other first guide member 3' will move following the other first guide groove $a'$ of the movable base plate 1 and thus, the other second guide member 2 is fastened at its intersection with the other first guide member 3' will move escaping in the other second guide groove $b$.

According to the present embodiment, if the degree of orthogonality only at one intersection between the guide members assembled in the form of parallel crosses is accurately measured in advance, no attention will need to be paid to the degree of parallelism during formation of the grooves because the movable base plate will be able to move in the two directions exactly at right angles. Also, since the guide members are fastened together at the intersections A and B, there may be provided a carriage which will never be affected by the rotational force in the direction of arrow Q but will always maintain accurate degree of orthogonality.

In the foregoing embodiment, two screws 4 are used for fastening the guide members at each of the intersections A and B, whereas if one screw is used to fasten the guide members at each of the intersections A and B, the guide members assembled in the form of parallel crosses will be rotated when the movable base plate 1 is subjected to an extraneous force rotating about the intersection between the diagonals of the first guide members 3, 3' and the second guide members 2, 2', as indicated by Q in the drawing.

In the conventional carriage wherein a single set of guide members is provided to move the carriage in the X- and Y-direction, it has been impossible to arbitrarily vary the angle formed between the guide members, whereas if one first guide member 3 and one second guide member 2' which are originally independent of each other are fastened together at a point as in the present invention, it becomes possible to arbitrarily vary the angle of intersection therebetween and as the result, the direction in which the movable base plate 1 is moved may also be varied arbitrarily.

In the present embodiment, one first guide member 3 is secured to one first guide groove $a$ or one second guide member 2' is secured to one second guide groove $b'$ in order to permit movement of the movable base plate 1 in the X- or the Y-direction, but where these are not securely fixed, the base plate 1 can be moved in any direction. In this latter case, one first guide member 3 and one second guide member 2' need not always be orthogonal to each other.

With the above-described constructions, even the carriage of the double-V mechanism type may be well operated even if the guide grooves are not always parallel but as long as they are good in degree of straightness, and this means the elimination of the difficulties which would otherwise be encountered to provide a good degree of parallelism between the guide grooves, and accordingly great ease with which the carriage of such type is made.

A second embodiment of the present invention will now be described.

In this embodiment, the two first guide grooves $a$ and $a'$ are finished with a high degree of straightness and very high degree of parallelism, and so are the two second guide grooves $b$ and $b'$, too.

In assembling the guide members in the form of parallel crosses as in the first embodiment, the second guide members 2 and 2' are first fitted in the second guide grooves $b$ and $b'$, respectively. This brings the second guide members 2 and 2'into a very high degree of parallelism, following the second grooves $b$ and $b'$. One of the first guide members, 3, is placed on the second guide members 2 and 2', and then the degree of orthogonality between said one first guide member 3 and the second guide members 2, 2' is accurately measured as by means of a right-angled ruler. They are then fastened together at one intersection A therebetween, by means of two screws 4. The subsequent procedures are entirely the same as those in the first embodiment, that is, said one first guide member 3 and the other first guide member 3' are caused to follow the first guide grooves $a$ and $a'$ of the movable base plate 1 to thereby position the other first guide member 3', whereafter the other first guide member 3' and the other second guide member 2 are fastened together by means of two screws 4, at the intersection B which is in diagonal relationship with the aforesaid intersection A. The angle formed at the intersection B between the other first guide member 3' and the other second guide member 2 necessarily becomes an exactly right angle. Therefore, the movable base plate 1 may be moved with the intersection A or B as the reference point, although, in the first embodiment, the carriage 1 is moved with the intersection A as the reference.

The manner in which the movable base plate 1 is operated is identical with that in the first embodiment.

Where each of the intersections A and B is fastened by a single screw, the movement of the movable base plate 1 may assume any desired direction as in the first embodiment.

In the present embodiment, right angles are accurately maintained both at the intersection A and the intersection B, so that the movable base plate 1 is always movable exactly in the X- and Y-direction and the measurement of the amount of movement of the movable base plate is made easier by mounting on the carriage a precision measuring instrument such as light wave interferometer or the like for measuring such amount of movement.

In the above-described first and second embodiments, the guide members assembled in the form of parallel crosses have been shown as being of trapezoidal cross-sectional shape, whereas this is not restrictive but the guide members may be of circular, square, rectangular or other suitable cross-sectional shape.

Thus, according to the present invention, there may be provided a carriage of the double-V mechanism type which is simple in construction and excellent in accuracy and easy to manufacture.

What is claimed is:

1. A cross-movable carriage comprising:

a movable base plate having two first guide grooves formed in one surface thereof;

a stationary base plate having two second guide grooves formed in one surface thereof;

two first guide members capable of fitting in said first guide grooves;

two second guide members capable of fitting in said second guide grooves;

one of said second guide members and one of said first guide members being fastened together to form a first assembly, the other of said second guide members and the other of said first guide members being fastened together to form a second assembly, said first and second assemblies being movable relative to each other to allow for variances in the position of said first and second guide grooves;

said guide members constituting a guide mechanism between said movable base plate and said stationary base plate to permit said first guide members to fit in said first guide grooves and permit said second guide members to fit in said second guide grooves.

2. A cross-movable carriage according to claim 1, wherein said one first guide member and said one second guide member are fastened together at a right angle therebetween.

3. A cross-movable carriage according to claim 2, wherein said first guide grooves are parallel to each other, said second guide grooves are parallel to each other, and the other second guide member and the other first guide member are fastened together at a right angle therebetween.

4. A cross-movable carriage according to claim 3, wherein the guide members are of trapezoidal cross-section and the grooves in which the guide members are fitted are matingly shaped.

* * * * *